April 22, 1947. A. F. TANNER 2,419,299
CHEESE CONTAINER
Filed June 8, 1945
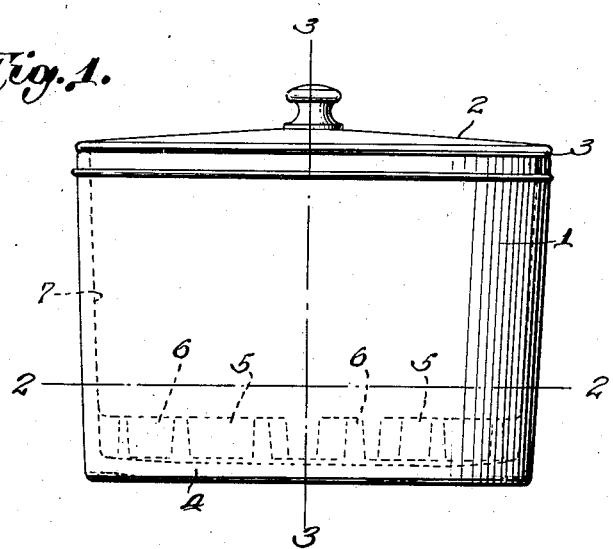
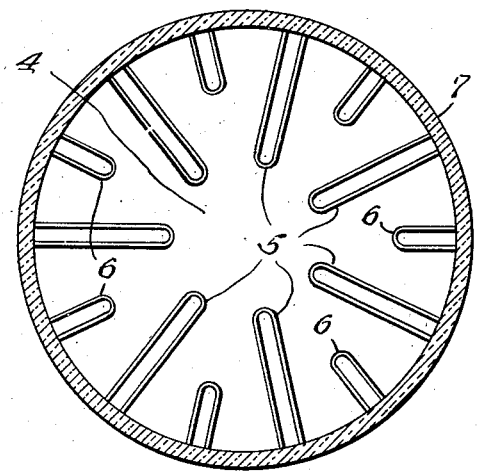 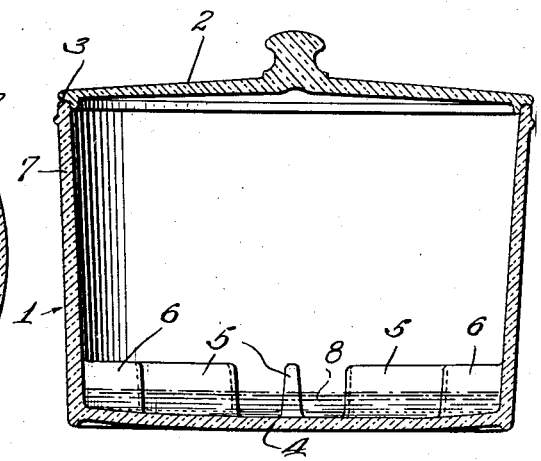
INVENTOR.
Arnold F. Tanner
BY
ATTORNEY.

Patented Apr. 22, 1947

2,419,299

UNITED STATES PATENT OFFICE 2,419,299

CHEESE CONTAINER

Arnold F. Tanner, Alliance, Ohio

Application June 8, 1945, Serial No. 598,391

2 Claims. (Cl. 99—269)

This invention is directed to an improvement in containers or jars designed more particularly for the temporary storage of cheese while preventing the escape of the natural moisture of the cheese during that storage.

As is well known cheese loses its natural moisture under even temporary storage and the surface hardens to a degree to compel the cutting away of the hardened layer and the loss of that portion of the cheese before a soft edible portion can be reached.

It is desirable to provide a container or jar in which the cheese, when not actually in use, may be temporarily stored until again required and to subject the cheese when so stored to the corrective action of a solution of known materials to prevent the moisture escape from the cheese, thus permitting the cheese to remain soft and edible at all times.

An important object of the present invention is to form at the bottom of the cheese container or jar a support formed to receive within its area a particular solution, with the surface of such support holding the cheese above the surface of the solution while the cheese is within the container.

A further object is the provision of a cheese support within the jar or container constructed with a view of preventing small bodies of cheese from falling into the solution, while at same time providing the support in such skeleton form that the solution-receiving space may be readily reached for cleaning when such becomes desirable or necessary.

The invention is illustrated in preferred form in the accompanying drawings, in which:

Fig. 1 is a view in elevation of the improved container as designed particularly for cheese, the cheese-supporting means being shown in dotted lines.

Fig. 2 is a sectional view of the same, taken on the line 2—2 of Fig. 1.

Fig. 3 is a further sectional view, taken on the line 3—3 of Fig. 1.

The improved container is substantially in jar form, and is preferably of glass or other transparent material. It will of course be understood that the container may be of any other form rather than cylindrical as shown and may be constructed of any appropriate material.

The container 1, shown as of cylindrical form, has an easily removable and replaceable cover 2, which in its contact with the upper edge of the container body is conventionally formed to insure an appreciable sealing contact of the cover, such sealing contact being shown at 3.

The bottom 4 of the vessel is formed to support the cheese loaf, being integrally provided for this purpose with ribs 5 and 6, radiating from the side wall 7 of the jar. It is important that the ribs, being the support of any size loaf of cheese introduced into the jar, must be capable of supporting such various sizes of loaves without permitting them to fall between the ribs. In addition these ribs must be formed and arranged so that the bottom of the jar may be easily and conveniently cleaned when desired without rib interference.

To this end the ribs 5 and 6 alternate circumferentially of the jar and are of materially different lengths in their extension from the side wall 7. The longer ribs 5 terminate near the central point of the bottom, terminally approaching sufficiently, however, to prevent any size loaf from falling between the inner ends of the ribs. The ribs 6 are of materially less length than the ribs 5, alternate with the latter and by reason of the radial projection of all ribs 5 and 6 from the wall 7, the ends of ribs 6 are sufficiently close to the ribs 5 to retain supported cheese.

The bottom of the container or jar is to be provided with a solution 8 for a depth about one-half the height of the ribs 5 and 6. This solution is of a nature to prevent or largely prevent the escape of the natural moisture of the cheese while the latter is stored in the jar, and thus maintain the surface of the cheese soft and edible even under long storage.

The cheese is supported by the upper surfaces of the ribs 5 and 6 well above the surface of the solution to avoid actual contact of the cheese and solution, and the excess depth of the ribs relative to the depth of the solution prevents any material splashing of the solution to reach the tops of the ribs even in casual moving of the container.

The salient feature of the present invention is the provision of the radial long and short ribs so arranged that at no place in the plane of their surface is there sufficient space to permit the cheese loaf to fall through into the solution, while at the same time the ribs are so spaced as to permit easy and convenient access between them for thorough cleaning of the ribs and jar bottom. If the ribs were of greater lengths they would approach so closely at their inner ends as to prevent proper access for cleaning.

The ribs 5 and 6 are preferably of the same height above the bottom and have upwardly convergent sides to provide upwardly tapering ribs. The ribs are preferably integral with the jar and may be solid or hollow. If hollow they may be open at their upper sides and could in themselves provide receptacles for the reception of the solution. This is shown in Fig. 3 and affords a relatively large solution area to avoid frequent refilling with solution.

It is known that a solution of vinegar and salt forms a desirable mixture to accomplish the desired protective influence on the cheese referred to, and while such a solution is preferred, it forms no material part of this invention and any other solution capable of having the desired effect may be used at will.

Having thus described the invention, what is claimed as new, is:

1. A cheese jar designed to carry a solution to prevent escape of the natural moisture of the cheese stored therein, and ribs integral with the side wall and radiating therefrom, said ribs being in contact with and extending slightly above the bottom of the jar, the ribs being alternately of short and long lengths, the short ribs being about one-half the length of the long ribs, the ribs upwardly tapering and sufficiently spaced to prevent the cheese falling between them.

2. A cheese jar designed to carry a solution to prevent escape of the natural moisture of the cheese stored therein, and ribs of hollow form radiating from the walls and in contact with and extending slightly above the bottom of the jar, the alternate ribs being of similar but radially different lengths than the other ribs, the ribs tapering upwardly from the bottom of the jar, the spacing of the free ends of the longer ribs being spaced apart substantially equal to the spacing of adjacent ribs at their points of connection with the walls, whereby to provide sufficient space for cleaning between adjacent jars.

ARNOLD F. TANNER.

REFERENCES CITED

The following references are of record in the file of this patent:

UNITED STATES PATENTS

| Number | Name | Date |
|---|---|---|
| 1,413,744 | LeDuc | Apr. 25, 1922 |
| 717,655 | Astle | Jan. 6, 1903 |
| 841,681 | French | Jan. 22, 1907 |

FOREIGN PATENTS

| Number | Country | Date |
|---|---|---|
| 24,568 | England | Nov. 16, 1908 |